(12) United States Patent
Barsun et al.

(10) Patent No.: US 6,922,336 B2  
(45) Date of Patent: Jul. 26, 2005

(54) PIVOTED FIELD REPLACEABLE UNIT APPARATUS AND METHOD

(75) Inventors: Stephan Karl Barsun, Auburn, CA (US); Irving McKenzie Birmingham, Rocklin, CA (US); Robert William Dobbs, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 10/411,699

(22) Filed: Apr. 11, 2003

(65) Prior Publication Data

US 2004/0201955 A1 Oct. 14, 2004

(51) Int. Cl.$^7$ .............................................. G06F 1/16
(52) U.S. Cl. ..................... 361/683; 361/727; 312/223.2
(58) Field of Search ..................... 361/683, 684–687, 361/724–727, 816, 818, 752–755, 796; 174/35 R, 35 GC, 252; 312/223.1, 223.2, 224, 298, 215, 219, 311; 29/11, 434; 16/254, 259, 267, 378; 220/4.02, 254, 255; 411/182, 549, 553

(56) References Cited

U.S. PATENT DOCUMENTS

| | | | |
|---|---|---|---|
| 2,789,024 A | 4/1957 | Heisler | |
| 3,708,618 A | 1/1973 | Hofmeister et al. | |
| 4,084,250 A | 4/1978 | Albertine et al. | |
| 4,268,100 A * | 5/1981 | Kekas et al. | 439/61 |
| 4,977,532 A | 12/1990 | Borkowicz et al. | |
| 5,097,386 A * | 3/1992 | Byell et al. | 361/695 |
| 5,311,397 A | 5/1994 | Harshberger et al. | |
| 5,571,256 A | 11/1996 | Good et al. | |
| 5,649,750 A | 7/1997 | Ishii et al. | |
| 5,737,184 A | 4/1998 | Lai | |
| 5,774,330 A * | 6/1998 | Melton et al. | 361/683 |
| 5,784,251 A * | 7/1998 | Miller et al. | 361/683 |
| 5,784,252 A * | 7/1998 | Villa et al. | 361/683 |
| 6,010,065 A | 1/2000 | Ramachandran et al. | |
| 6,025,989 A | 2/2000 | Ayd et al. | |
| 6,055,152 A | 4/2000 | Felcman et al. | |
| 6,111,754 A * | 8/2000 | Abbott et al. | 361/724 |
| 6,229,696 B1 * | 5/2001 | Lin et al. | 361/683 |
| 6,301,099 B1 * | 10/2001 | Felcman et al. | 361/683 |
| 6,304,437 B1 | 10/2001 | Foo et al. | |
| 6,305,556 B1 | 10/2001 | Mayer | |
| 6,392,875 B1 * | 5/2002 | Erickson et al. | 361/683 |
| 6,404,625 B1 * | 6/2002 | Chen et al. | 361/683 |
| 6,530,628 B1 * | 3/2003 | Huang et al. | 312/223.2 |
| 6,580,603 B1 * | 6/2003 | Resnick | 361/683 |
| 6,597,566 B1 * | 7/2003 | Phan | 361/683 |
| 6,603,664 B1 * | 8/2003 | Gallarelli et al. | 361/747 |
| 6,737,577 B1 * | 5/2004 | Liao et al. | 174/50 |
| 6,741,473 B2 * | 5/2004 | Chen | 361/727 |
| 6,788,544 B1 | 9/2004 | Barsun et al. | |
| 2001/0037985 A1 | 11/2001 | Varghese et al. | |
| 2002/0172003 A1 * | 11/2002 | Bang et al. | 361/683 |
| 2004/0066631 A1 * | 4/2004 | Natsume et al. | 361/721 |
| 2004/0070955 A1 * | 4/2004 | Dobbs et al. | 361/752 |
| 2004/0184243 A1 * | 9/2004 | Mease et al. | 361/725 |

FOREIGN PATENT DOCUMENTS

| | | | | |
|---|---|---|---|---|
| GB | 2 328 528 A | * | 2/1999 | G06F/1/18 |
| JP | 407274318 A | * | 10/1995 | H02B/1/32 |
| JP | 02001085860 A | * | 3/2001 | H05K/5/02 |

* cited by examiner

*Primary Examiner*—Michael Datskovskiy

(57) ABSTRACT

Disclosed herein are exemplary embodiments of a Pivoted Field Replaceable Unit (FRU) for an electronic device.

10 Claims, 6 Drawing Sheets

PIVOTED FIELD REPLACEABLE UNIT APPARATUS AND METHOD

RELATED APPLICATION

The present application is related to U.S. patent application Ser. No. 10/411,671, filed Apr. 11. 2003, for FIELD REPLACEABLE UNIT ACCESS DEVICE AND METHOD of Stephan K. Barsun et al., now U.S. Pat. No. 6,788,544, which is hereby specifically incorporated by reference for all that is disclosed therein.

BACKGROUND

Electronic systems contain devices that often need repair, replacement, or upgrading during the lifespan of the systems. Various apparatus and methods have been developed to improve the process of replacing these devices.

SUMMARY

In one exemplary embodiment, apparatus for electronically processing information may include: a chassis; a frame pivotally attached to the chassis, wherein the frame comprises a first surface and a second surface; a first electronic component removably attached to the first surface; and a second electronic component removably attached to the second surface.

BRIEF DESCRIPTION OF THE DRAWING

Illustrative embodiments are shown in Figures of the Drawing in which.

DETAILED DESCRIPTION

Figure 1:
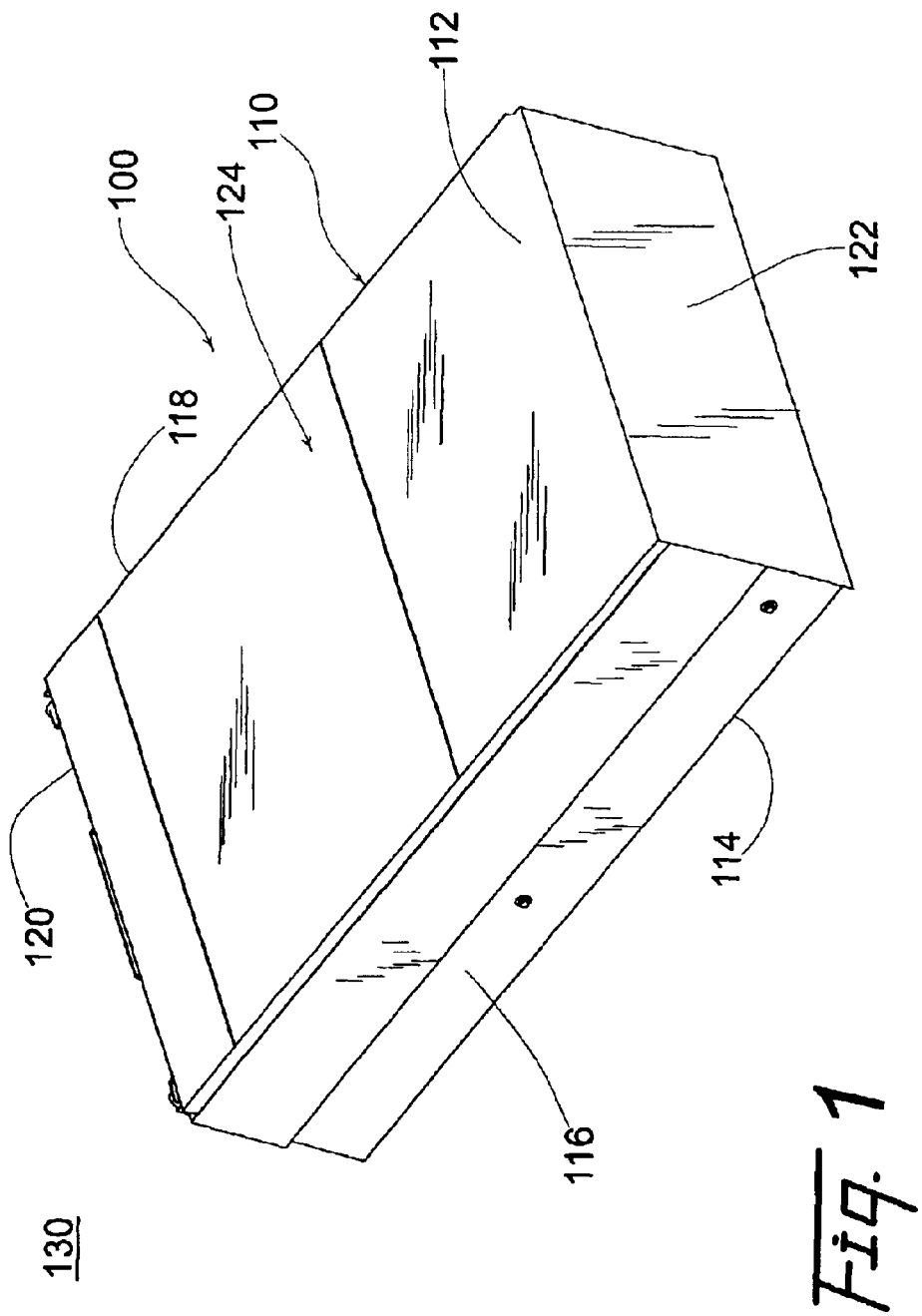
FIG. 1 shows a perspective view of an exemplary embodiment of an electronic device provided with an access door.

FIG. 1 illustrates a perspective view of a device for electronically processing information such as a server 100. Components located within the server 100 may require replacement or repair. Removal and/or replacement of components is simplified by the present pivoted Field Replacable Unit (FRU) that allows components located within the server 100 to be readily accessed.

Figure 3:
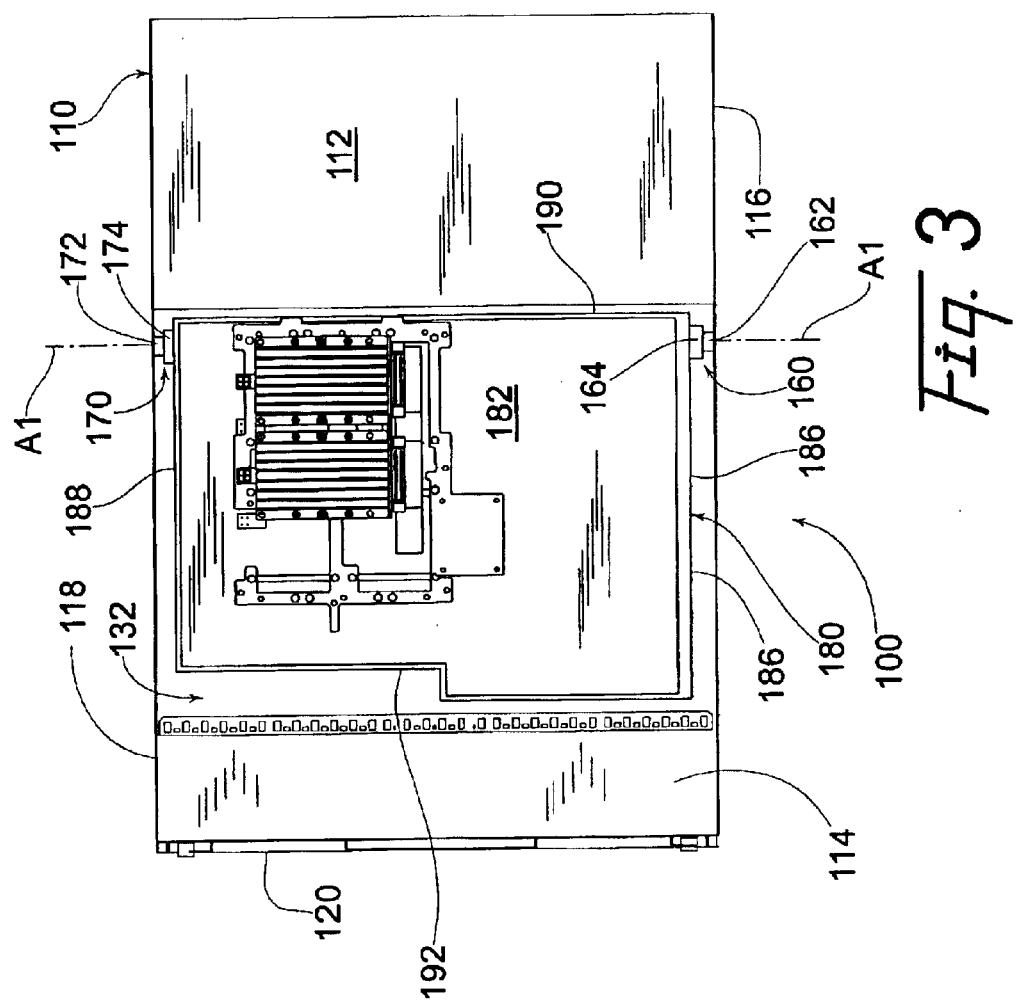
FIG. 3 shows a top plan view of the electronic device of FIG. 2 with internal components thereof located in an internal portion of the electronic device.

With continued reference to FIG. 1, the server 100 may be encased by a chassis 110. The chassis 110 may be provided with a top panel 112, a bottom panel 114, a first side panel 116, a second side panel 118, a rear panel 120 and a front panel 122. The panels 112, 114, 116, 118, 120 and 122 of the chassis 110 may be formed in a somewhat parallelepiped configuration substantially separating an external portion 130 from an internal portion 132 (FIG. 3). The sever 100 may be provided with an access door 124. The access door 124 may be formed in the top panel 112. When the access door 124 is moved to an open position (e.g. removed from the top panel 112), passage between the external portion 130 and the internal portion 132 may occur therethrough. One exemplary configuration for movably attaching the access door 124 to the top panel 112 may include threadingly attaching the access door 124 to the top panel 112 (although a variety of other attachment methods may be utilized).

It is to be understood that terms such as 'front', 'back', 'top', 'bottom', 'horizontal', 'vertical', 'underneath' and the like are used herein for illustrative purposes only. In actual use, the server 100 can be configured and/or used in almost any orientation, thus making terms such as 'front', 'back', 'top', 'bottom', 'horizontal', 'vertical', 'underneath', etc. relative to the orientation of the server 100.

Figure 2:
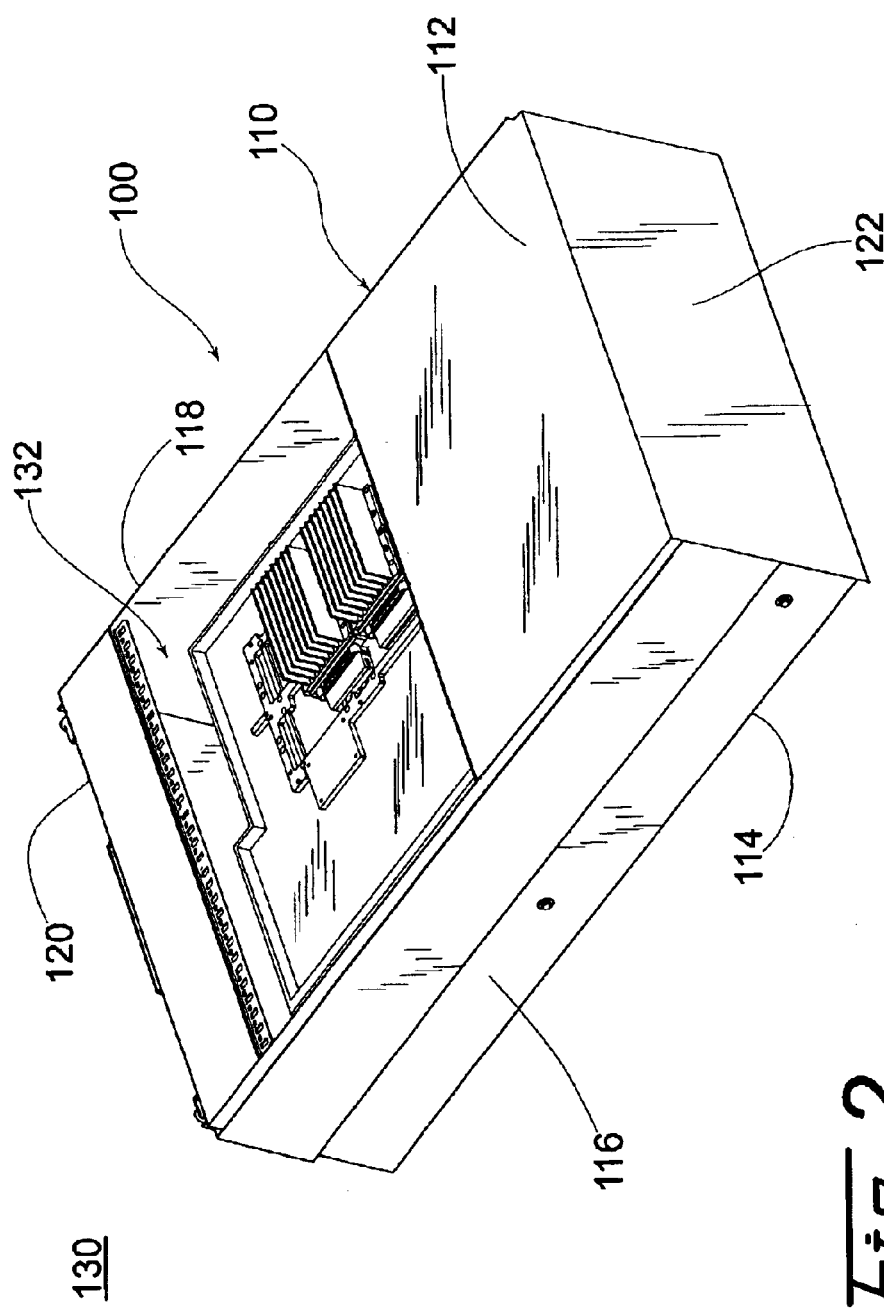
FIG. 2 shows a perspective view of the electronic device of FIG. 1 with the access door removed therefrom.

FIG. 2 illustrates a perspective view of the server 100 with the access door 124 removed to allow passage between the external and internal portions 130, 132. This removal of the access door 124 may occur, for example, by removing fasteners (not shown) and separating the access door 124 from the chassis 110.

With the access door 124 removed as illustrated in FIG. 2, internal components of the server 100 may be accessed. FIG. 3 illustrates a top plan view of the server 100 with the access door 124 removed therefrom and exemplary internal components. With reference to FIG. 3, the server 100 may be provided with a first pivot 160. The first pivot 160 may include a first member 162 and a second member 164. The first member 162 of the first pivot 160 may pivot with respect to the second member 164 about a first axis A1. The first member 162 of the first pivot 160 may be fixedly attached to the first side panel 116. The second member 164 of the first pivot 160 may be pivotally supported by the first member 162, thereby allowing rotation of the second member 164 with respect to chassis 110 about the first axis A1.

With continued reference to FIG. 3, the server 100 may be provided with a second pivot 170. The second pivot 170 may be 'aligned' with the first pivot 160 thereby resulting in a common axis (e.g. first axis A1) of rotation for the pivots 160, 170. The second pivot 170 may include a first member 172 and a second member 174. The first member 172 may pivot with respect to the second member 174 about the first axis A1. The first member 172 of the second pivot 170 may be fixedly attached to the second side panel 118. The second member 174 of the second pivot 170 may be pivotally supported by the first member 172, thereby allowing rotation of the second member 174 with respect to the chassis 110.

Figure 4:
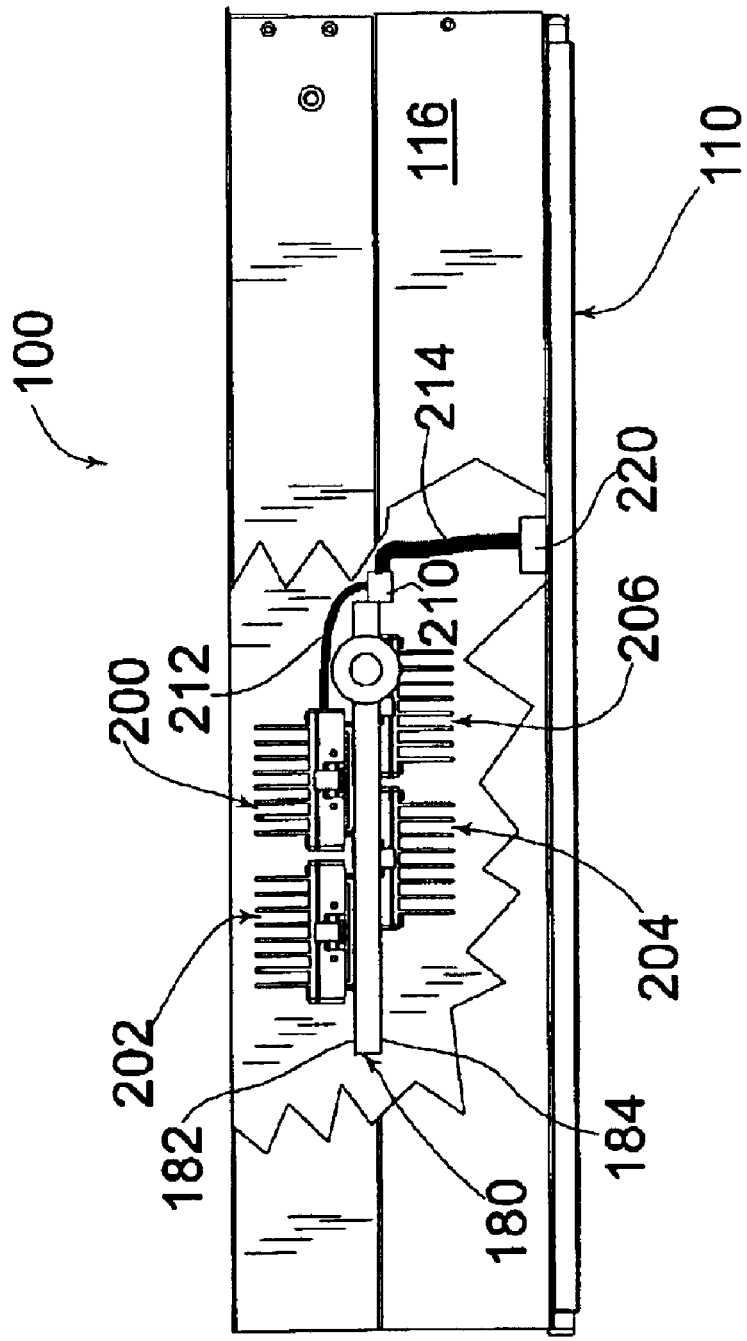
FIG. 4 shows a side elevation view of the electronic device of FIG. 3.

With continued reference to FIG. 3, the server 100 may be provided with a frame 180. The frame 180 may be provided with a top surface 182, a bottom surface 184 (FIG. 4), a first edge 186, a second edge 188, a front edge 190 and a back edge 192. The top surface 182 may be substantially parallel to and oppositely disposed from the bottom surface 184 (FIG. 4). The first edge 186 may be substantially parallel to and oppositely disposed from the second edge 188. The frame 180 may be attached to the chassis 110 via the first and second pivots 160, 170. The second member 164 of the first pivot 160 may be attached to the first edge 186 of the frame 180. The second member 174 of the second pivot 170 may be attached to the second edge 188 of the frame 180. This attachment of the frame 180 to the pivots 160, 170 results in the frame being 'pivotally attached' to the chassis 110.

FIG. 4 shows a side elevation of the server 100 in which a portion of the first side panel 116 is broken-away to allow a portion of the internal portion 132 of the server 100 to be shown. With reference to FIG. 4, the frame 180 may be provided with a plurality of Field Replaceable Units that are commonly referred to herein as 'FRUs'. FRUs may be any type of a variety of components such as, for example, power supplies, heat sinks, fans, processors, capacitors, circuit boards, etc. It is to be understood that FRUs may be any type of component and the previous examples are provided for illustrative purposes only. FIG. 4 illustrates FRUs that include processors and heat sinks; these FRUs may include a first FRU 200, a second FRU 202 a third FRU 204 and a fourth FRU 206. The first and second FRUs 200, 202 may be removably attached to the top surface 182 of the frame 180. The third and fourth FRUs 204, 206 may be removably attached to the bottom surface 184 of the frame 180. As used herein, the term 'removably attached' refers to components, such as FRU 200, that are removable from the frame 180 by acting upon some element (such as, for example, a lever, a fastener, a friction fit, etc.).

With continued reference to FIG. 4, the frame 180 may be provided with a connector 210, a receptacle 212 and a flex cable 214. The connector 210 may be electrically interfaced with various components, such as the first FRU 200 and the second FRU 202, via conductors 212. The chassis 110 may be provided with the receptacle 220. The receptacle 220 may be fixedly attached to the chassis 110. The receptacle 220 may be configured to receive electrical signals from the connector 210 via the flex cable 214, thereby permitting electrical communication therebetween.

Having provided a description of one exemplary embodiment of the Pivoted Field Replacable Unit (FRU), a description of using the device will now be provided.

Figure 5:
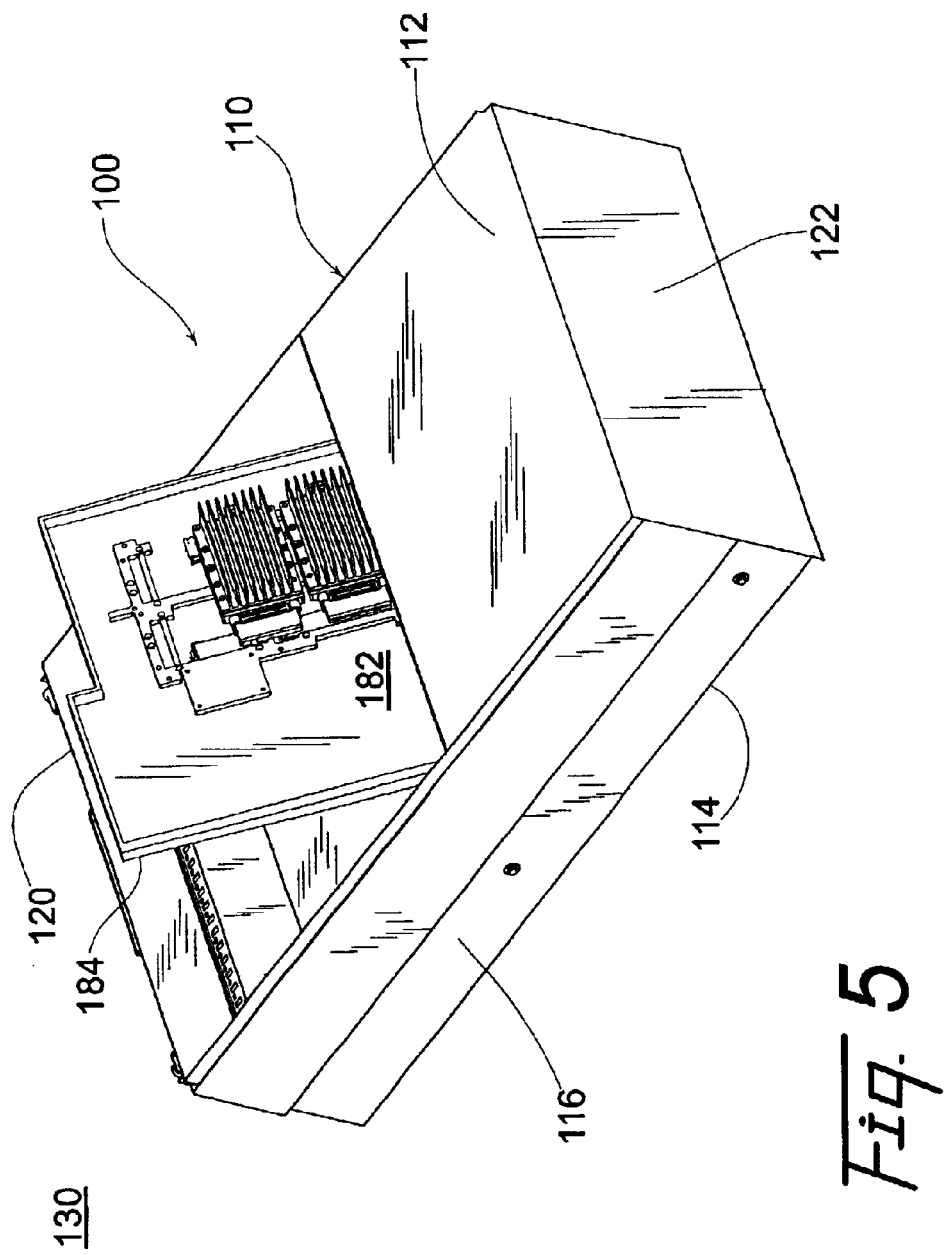
FIG. 5 shows a perspective view of the electronic device of FIG. 2 with internal components thereof pivoted and therefore located in an external portion of the electronic device.

FIG. 5 illustrates a pivoted condition wherein the frame 180 has been pivoted with respect to the chassis 110. With reference to FIG. 5, by incorporating the present Pivoted Field Replaceable Unit (FRU) into the server 100, a user can rotate the frame 180 to improve accessibility to components located on the frame 180 (in particular, to FRUs located on the bottom surface 184 of the frame 180).

Figure 6:
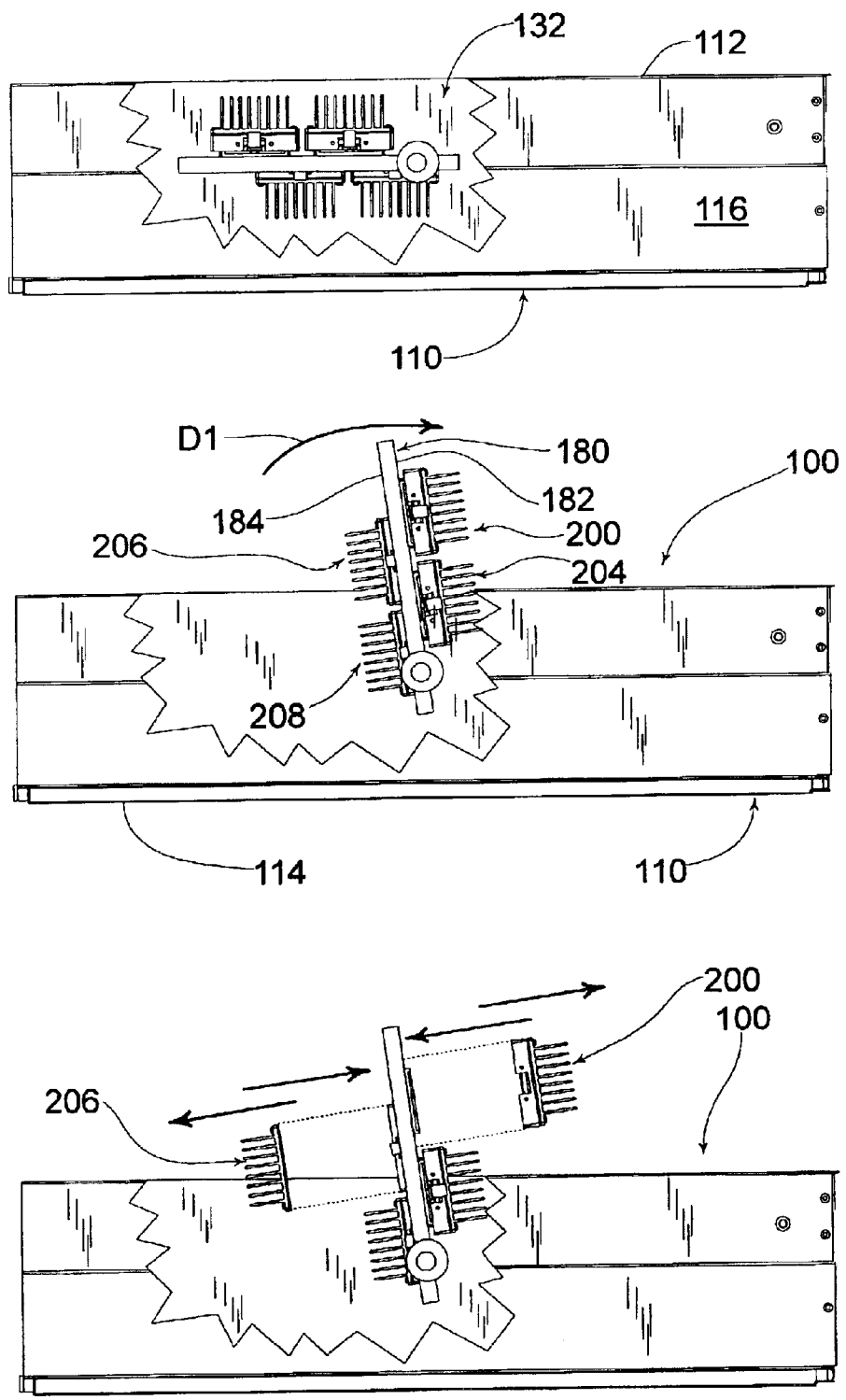
FIG. 6 shows a series of 'snapshots' of the electronic device of FIG. 2 as components located therein are accessed.

FIG. 6 illustrates a series of 'snapshots' of the present FRU access device while it is being used. It is to be understood that these snapshots are provided for illustrative purposes only and that they depict conditions which may only exist for a brief period of time during the entire process. The first snapshot of FIG. 6 illustrates the process of gaining access to the internal portion 132 of the chassis 110. In order to gain access to the internal portion 132, a user may, for example, remove access door 124 (FIG. 1) from the top panel 112.

After gaining access to the internal portion 132 of the chassis 110, the user may apply a force to the frame 180 to cause movement of the frame 180 in a first direction D1 as illustrated in the second snapshot of FIG. 8. This movement of the frame 180 in the first direction D1 allows access to the FRUs 204, 206 located on the bottom surface 184 of the frame 180. This rotation of the frame 180 results in the frame 180 moving from a condition wherein the frame 180 is substantially parallel to the bottom panel 114 of the chassis 110 to a non-parallel condition wherein the frame 180 is transverse to the bottom panel 114.

This positioning of the frame 180 simplifies the process of accessing and/or removing one or more of the FRUs (e.g. third FRU 206). Once the third FRU 206 is removed from the frame 180 as illustrated in the third snapshot of FIG. 8, a replacement FRU substantially similar to the third FRU 206 may be attached to the frame 180.

After the replacement FRU (e.g. third FRU 206) has been attached to the frame 180, the process of removing the FRU may be reversed to restore the typical operating condition illustrated in the first snapshot of FIG. 8.

In one exemplary embodiment, the server 100 may be any type of device for electronically processing information such as, for example, a computer system, a network switch, an audio rack, data acquisition equipment, telecommunications equipment, etc.

While illustrative embodiments have been described in detail herein, it is to be understood that the concepts may be otherwise variously embodied and employed and that the appended claims are intended to be construed to include such variations except insofar as limited by the prior art.

We claim:

1. An electronic apparatus comprising:
   a chassis;
   a frame pivotally attached to said chassis, wherein said frame comprises a first surface and a second surface;
   a first electronic component removably attached to said first surface;
   a second electronic component removably attached to said second surface; and
   an access door formed on said chassis, wherein said frame is pivotally movable through said access door.

2. The apparatus of claim 1 and further comprising:
   a first pivot attached to said frame.

3. The apparatus of claim 2 and further comprising:
   a second pivot attached to said frame, said second pivot being aligned with said first pivot.

4. The apparatus of claim 1 wherein:
   said apparatus comprises a first condition and a second condition;
   said chassis defines a bottom;
   in said first condition, said frame is parallel to said bottom; and
   in said second condition, said frame is transverse to said bottom.

5. The apparatus of claim 1 and further comprising:
   a connector attached to said frame, said connector electrically interfaced with said first electronic component and said second electronic component;
   a receptacle attached to said chassis; and wherein said receptacle electronically couples with said connector.

6. The apparatus of claim 5 and further comprising:
   a flex cable attached to said connector and said receptacle.

7. A method of servicing a computer system, said method comprising:
   providing a chassis comprising an opening;
   providing a frame pivotally attached to said chassis and pivotally translatable through said opening;
   providing an electronic component removably attached to said frame;
   pivoting said frame through said opening; and removing said electronic component from said frame.
   providing an access door removably covering said opening; and
   removing said access door from said opening prior to said pivoting said frame.

8. The method of claim 7 and further comprising:
   providing a pivot attached to said chassis and said frame;
   wherein said pivoting said frame comprises actuating said pivot.

9. An electronic apparatus comprising:
   a chassis comprising a bottom;
   a frame;
   a electronic component;
   a rotation means connecting said frame to said chassis;
   a mounting means for attaching said electronic component to said frame; and
   an access door formed on said chassis, wherein said frame is pivotally movable through said access door.

10. The apparatus of claim 9 wherein said rotation means comprises a pivot.

* * * * *